D. JACKSON.
PIPE FITTING.
APPLICATION FILED JULY 19, 1918.
1,307,551.
Patented June 24, 1919.
2 SHEETS—SHEET 1.
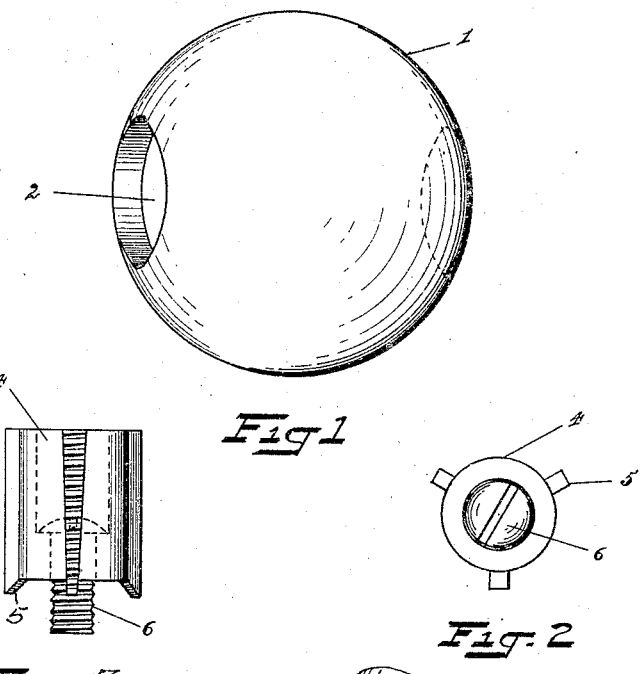
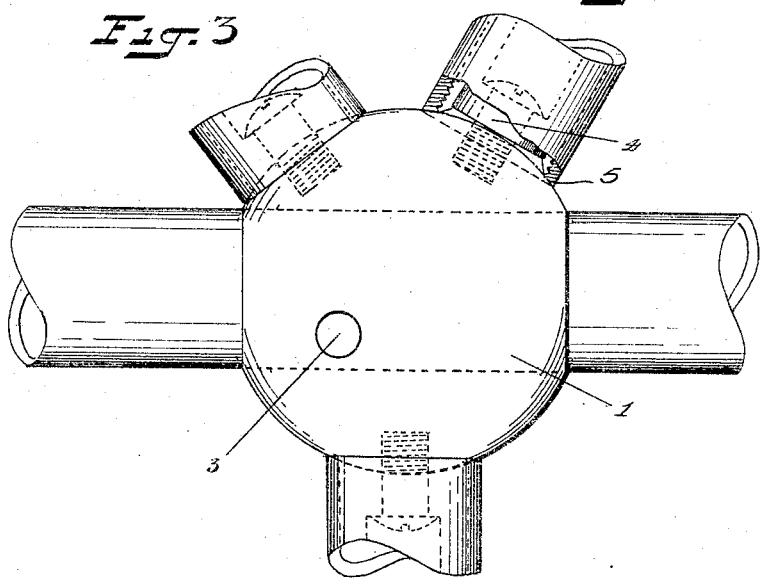
TWO WITNESSES
DAVID JACKSON
Inventor

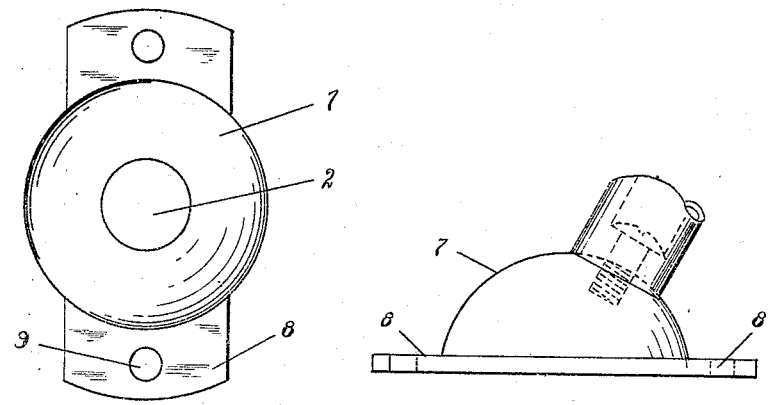
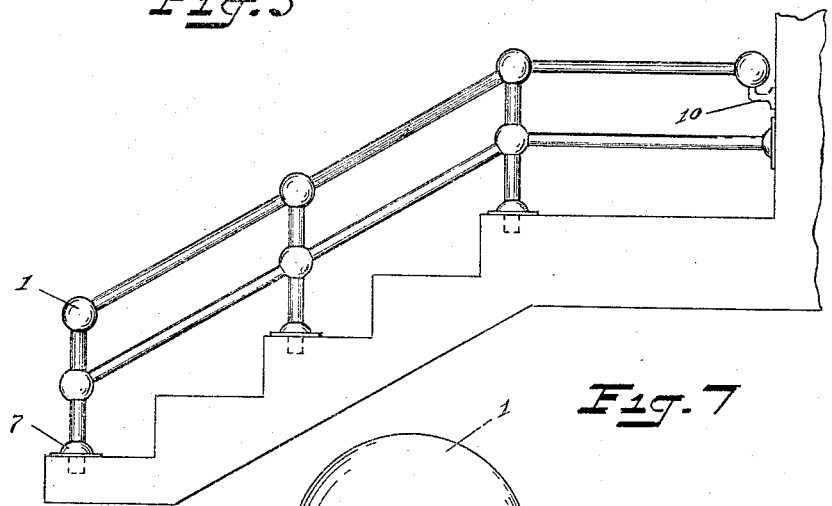
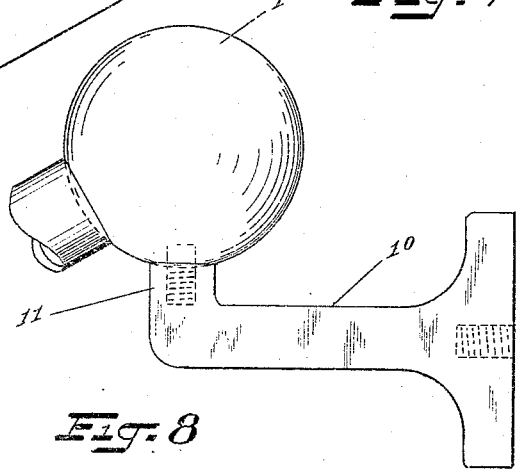

UNITED STATES PATENT OFFICE.

DAVID JACKSON, OF TORONTO, ONTARIO, CANADA.

PIPE-FITTING.

1,307,551. Specification of Letters Patent. Patented June 24, 1919.

Application filed July 19, 1918. Serial No. 245,657.

*To all whom it may concern:*

Be it known that I, DAVID JACKSON, a subject of the King of Great Britain, and resident of 28 Bastedo Ave., city of Toronto, county of York, Province of Ontario, in the Dominion of Canada, have invented certain new and useful Improvements in Pipe-Fittings, of which the following is a specification.

The invention relates to improvements in pipe fittings as described in the present specification and illustrated in the accompanying drawings that form a part of the same.

The objects of the invention are to provide a standard form of fitting from which one or more pipes may be projected at any desired angle, to eliminate the necessity of having to construct special patterns for each fitting, thereby creating a very great saving in time and cost of installing railings and the like, to insure a smooth and finished appearance and generally to provide a pipe fitting which will be inexpensive to manufacture, durable and efficient.

In the drawings Figure 1 is a view of the ball or fitting from which the various pipes are projected.

Fig. 2 is an end view of the pipe supporting member adapted to be secured to the fitting shown in Fig. 1.

Fig. 3 is a side view of the device shown in Fig. 2.

Fig. 4 is a view of the fitting showing pipes radiating therefrom at various angles, one of said pipes being broken away to disclose the interiorly threaded portion.

Fig. 5 is a plan view of a floor bracket according to the present invention.

Fig. 6 is a side view of a floor bracket and pipe.

Fig. 7 is a side elevation of a stairway and landing showing the various railings connected by the method of the present invention.

Fig. 8 illustrates the method of connecting the fitting to a wall.

Like numerals of reference indicate corresponding parts in each figure.

Referring to the drawings 1 is a hollow metal ball forming the basis of the fitting, said ball owing to its spherical formation constituting a means for obtaining any desired angle of projection therefrom.

It will be found in the connecting up of pipes as in the construction of stair railings and the like that in a very great majority of cases it is required to project pipes from opposite sides of the fitting and for this purpose the ball 1 is provided with an opening 2 therethrough of sufficient size to permit of the pipe to be used passing therethrough but in the case of where the fitting is used at the end of a railing the opening may simply extend through one wall of the fitting.

As any angle of projection may be obtained from the outer periphery of the fitting it will be seen that it is now only necessary to provide a means for securing the pipe or pipes to said fitting and this is accomplished in the following manner.

The angle at which it is desired to project the pipe is first determined and a small threaded opening 3 is then bored through the wall of the fitting in the direction of the center thereof. A pipe supporting member comprising a tubular portion 4 having flanges 5 projecting outwardly therefrom and threaded is secured over the opening 3 by means of a screw 6 countersunk within said tubular portion and screwing into said opening 3. The end of the pipe to be connected is then screwed over the tubular supporting member.

It will frequently be found in practice that the pipe will be held quite rigidly without the necessity of providing the flanges 5 of the member 4 with threads.

For securing a rail to a floor or other permanent bracket a half ball or semi-circular member 7 having flanges 8 projecting outwardly therefrom, and provided with screw holes 9 is utilized, said member 7 having, in cases where the pipe is required to project at right angles from the supporting bracket, a large central opening 2 and, where the rail is to project at a different angle being adapted to be provided with a small threaded opening 3 bored at the required angle, to receive the member 4.

For securing the fitting of a stair railing to a wall a bracket 10 having a screw or bolt rigidly secured in the outer end 11 thereof adapted to engage a corresponding hole 3 in the fitting is provided.

It will thus be seen that the matter of providing a fitting for any particular portion of a railing resolves itself down to the simple expediency of boring holes in a standard fitting at the required angle of projection.

In Figs. 4 and 6 of the drawings pipes are shown projecting from the fittings at various angles from which it will be seen that in the case of center joints one of the rails passes right through the ball while the other pipes are secured thereto by means of the members 4 and screws 6. The pipes or rails are in all cases cut square at the ends and the inner side edges are preferably cut away slightly, as shown in Fig. 4, to provide a perfectly smooth joint.

By the use of the present invention the fittings may be always kept in stock and it is only necessary to bore the various holes during the course of construction of the railing. The boring of the various small holes will not in any way weaken the fitting and this will be found to be a decided advantage over the various slotted devices now in use, which, besides weakening the fitting do not permit of obtaining all angles.

What I claim is:—

1. In a pipe fitting, a hollow circular base, a pipe opening through said base, a pipe support adapted to be projected from said base at any desired point, a threaded pin having its head countersunk in said pipe support and screwing into said base toward the center thereof for securing said pipe and a pipe screwing over said pipe support and abutting said base.

2. In a pipe fitting, the combination with a hollow circular base having a pipe opening therethrough, of a pipe support adapted to be projected from said base at any desired angle and comprising a tubular member having longitudinally arranged flanges thereon projecting therebeyond at one end and shaped to fit the outer surface of said base and a threaded pin countersunk in said pipe support and screwing into said base.

Signed at Toronto, Ont., this 13th day of July, 1918.

DAVID JACKSON.

Witnesses:
W. G. HAMMOND,
J. A. CAMPBELL.

Copies of this patent may be obtained for five cents each, by addressing the "Commissioner of Patents, Washington, D. C."